G. S. FOWLER.
PISTON FOR INTERNAL COMBUSTION ENGINES.
APPLICATION FILED JUNE 27, 1919.
1,399,106.
Patented Dec. 6, 1921.
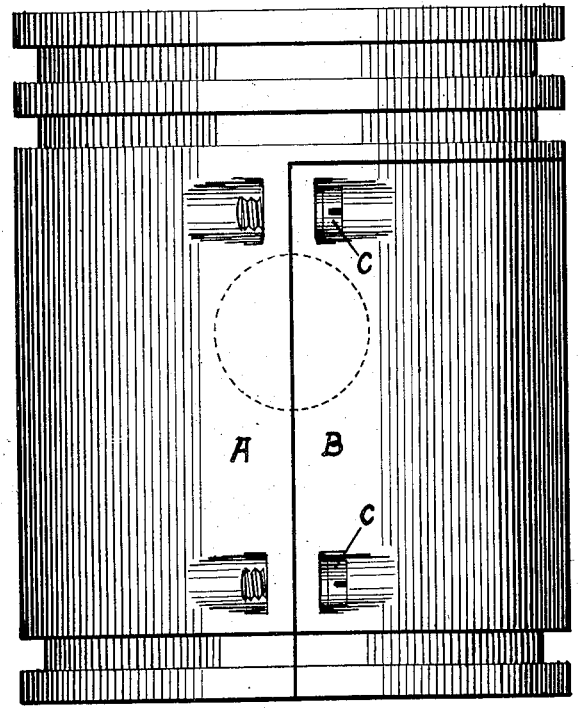
WITNESSES
INVENTOR

UNITED STATES PATENT OFFICE.

GEORGE S. FOWLER, OF JOPLIN, MISSOURI.

PISTON FOR INTERNAL-COMBUSTION ENGINES.

1,399,106.

Specification of Letters Patent.

Patented Dec. 6, 1921.

Application filed June 27, 1919. Serial No. 307,101.

*To all whom it may concern:*

Be it known that I, GEORGE S. FOWLER, a citizen of the United States, residing at 1728 Connor Ave., in the city of Joplin, in the county of Jasper, in the State of Missouri, have invented new and useful Improvements in Pistons for Internal-Combustion Engines, of which the following is a specification, reference being had therein to the accompanying drawing.

My invention relates to improvements in pistons for internal combustion engines, in which the piston is made of two sections secured together by bolts or screws in such manner as to admit of adjustment.

The objects of my invention are: first, to eliminate piston slap, a noise familiar to those versed in engines, without using a new piston; second, to produce a piston that will wear longer; third, to make an adjustable piston.

In the drawing, A represents the main section of the piston, B is a detachable section secured to the main section A by bolts or screws which are designated by the letter C in drawing. These bolts or screws are recessed within the circumference of the piston as shown in the drawing. Referring to the drawing, the dotted circle E indicates the position of the piston pin. Sections A and B of the piston are shown as joined together in a plane which passes through the piston pin. This piston is cylinder shaped.

In my invention due consideration has been given to simplicity of design and low production cost. After the edges of sections A and B have been machined, these sections are joined together, then the piston is finished as though it were a single piece, reamed for the piston pin and grooved for a plurality of rings.

On the piston of an internal combustion engine wear is greatest upon the surfaces represented by the extreme right and left of the drawing, and decreases to the minimum toward the part of the piston represented by the center of the drawing. In my invention this wear is eliminated by inserting metal shims between sections A and B equal to the amount of such wear.

I claim:

A piston comprising a substantially cylindrical piston head, a substantially semi-cylindrical portion integral therewith and forming a part of the body of the piston, a second substantially semi-cylindrical portion, said semi-cylindrical portions being provided with recesses adjacent the meeting edges and openings adapted to register with each other and bolts arranged in said openings to retain said second semi-cylindrical portions in position, the semi-cylindrical portions being secured to each other in a plane substantially in alinement with the plane of the center of the wrist pin.

GEORGE S. FOWLER.

Witnesses:
JOHN H. JOHNSON,
MORRISON B. FOWLER.